US012074396B2

(12) United States Patent
Henry et al.

(10) Patent No.: US 12,074,396 B2
(45) Date of Patent: Aug. 27, 2024

(54) PLUG CONNECTOR

(71) Applicant: TE Connectivity Services GmbH, Schaffhausen (CH)

(72) Inventors: Randall Robert Henry, Lebanon, PA (US); Brandon Michael Matthews, McAlisterville, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 0 days.

(21) Appl. No.: 17/586,917

(22) Filed: Jan. 28, 2022

(65) Prior Publication Data

US 2023/0246382 A1 Aug. 3, 2023

(51) Int. Cl.
*H01R 13/627* (2006.01)
*H01R 12/72* (2011.01)
*H01R 12/75* (2011.01)

(52) U.S. Cl.
CPC ....... *H01R 13/6273* (2013.01); *H01R 12/727* (2013.01); *H01R 12/75* (2013.01)

(58) Field of Classification Search
CPC ............ H01R 13/6275; H01R 13/6273; H01R 13/627; H01R 12/727; H01R 12/75
USPC ......................................... 439/358, 352, 492
See application file for complete search history.

(56) References Cited

U.S. PATENT DOCUMENTS 6,071,141 A * 6/2000 Semmeling ........ H01R 13/6275 439/353
6,364,687 B1 * 4/2002 Chen .................. H01R 13/6275 439/607.02
6,565,383 B1 * 5/2003 Wu .................... H01R 12/7023 439/567
7,014,491 B1 * 3/2006 Simmel .............. H01R 13/6275 439/352
7,018,231 B2 * 3/2006 Liu .................... H01R 13/5845 439/492
7,083,459 B1 * 8/2006 Wu .................... H01R 13/6275 439/354
8,870,586 B2 * 10/2014 Wang ................. H01R 13/6335 439/358
10,020,614 B1 * 7/2018 Bucher .............. H01R 13/6275
10,547,142 B1 * 1/2020 Henry ..................... H01R 12/79
11,398,694 B2 7/2022 Henry et al.
2006/0046555 A1 * 3/2006 Wu .................... H01R 13/6275 439/357
2011/0104931 A1 * 5/2011 Wu .................... H01R 13/6275 439/358
2014/0038447 A1 * 2/2014 Brown ................... H01R 13/62 439/350
2023/0238728 A1 7/2023 Henry et al.

* cited by examiner

*Primary Examiner* — Gary F Paumen

(57) ABSTRACT

A plug connector includes a plug housing including a mating end and a cable end perpendicular to the mating end. The contact assembly includes an array of contacts each having a mating end and a terminating end. The contacts are right-angle contacts terminated to an end of a conductor of a cable. The plug connector includes a latch coupled to the plug housing. The latch includes a main body and a latch member extending from the main body. The main body has an actuator is configured to actuate the latch. The latch member includes a securing base coupled to the plug housing to secure the latch to the plug housing. The latch member includes a latching tab configured to be latchably coupled to the mating connector to secure the plug connector to the mating connector.

20 Claims, 6 Drawing Sheets

PLUG CONNECTOR

BACKGROUND OF THE INVENTION

The subject matter herein relates generally to plug connectors.

Electrical connectors are used to electrically connect various components within a communication system. Some systems use receptacle connectors, which may be mounted to a circuit board, and plug connectors, which may be provided at ends of cables. Some known receptacle connectors include card slots that receive paddle cards of the plug connectors. Conductors from cables are terminated to the paddle cards and extend from the paddle cards to another component. The cables extending from the plug connector occupy space exterior of the plug connector, which restricts how close other components may be positioned relative to the receptacle connector and the plug connector. Some known plug connectors orient the cables to extend from the bottom of the plug connector to allow components to be located behind the plug connector. For example, the cables are bent within the interior chamber of the plug connector toward the bottom to extend from the bottom. Such plug connectors have long overall lengths. Additionally, latching components may extend from the plug connector housing, such as from the rear of the housing, which increase the overall length of the plug connector.

A need remains for a plug connector having a short profile.

BRIEF DESCRIPTION OF THE INVENTION

In one embodiment, a plug connector is provided and includes a plug housing including a mating end and a cable end. The cable end is oriented perpendicular to the mating end. The plug housing includes a mating chamber at the mating end and a cable chamber at the cable end. The plug connector includes a contact assembly coupled to the plug housing. The contact assembly includes an array of contacts. Each contact includes a mating end and a terminating end. Each contact is a right angle contact has the terminating end being perpendicular to the mating end. The mating end is configured to be mated with a mating connector. The terminating end is configured to be terminated to an end of a conductor of a cable. The plug connector includes a latch coupled to the plug housing. The latch includes a main body and a latch member extending from the main body. The main body has an actuator is configured to actuate the latch. The latch member includes a securing base coupled to the plug housing to secure the latch to the plug housing. The latch member includes a latching tab configured to be latchably coupled to the mating connector to secure the plug connector to the mating connector.

In another embodiment, a plug connector is provided and includes a plug housing having a front and a rear. The plug housing has a top and a bottom. The plug housing has a first side and a second side. The plug housing includes a mating end at the front of the plug housing and a cable end at the bottom of the plug housing. The plug housing includes a mating chamber at the mating end and a cable chamber at the cable end. The plug connector includes a contact assembly coupled to the plug housing. The contact assembly includes an array of contacts. Each contact includes a mating end and a terminating end. Each contact is a right angle contact having the terminating end being perpendicular to the mating end. The mating end is configured to be mated with a mating connector. The terminating end is configured to be terminated to an end of a conductor of a cable. The plug connector includes a latch coupled to the plug housing. The latch has a rear located at or forward of the rear of the plug housing. The latch includes a main body and a latch member extending from the main body. The main body has an actuator configured to actuate the latch. The actuator is provided at the rear. The latch member includes a securing base coupled to the plug housing to secure the latch to the plug housing. The latch member includes a latching tab configured to be latchably coupled to the mating connector to secure the plug connector to the mating connector.

In a further embodiment, a plug connector is provided and includes a plug housing including a mating end and a cable end. The cable end is oriented perpendicular to the mating end. The plug housing includes a mating chamber at the mating end and a cable chamber at the cable end. The plug housing includes a latch chamber and a window open to the latch chamber. The plug connector includes a contact assembly coupled to the plug housing. The contact assembly includes an array of contacts. Each contact includes a mating end and a terminating end. Each contact is a right angle contact having the terminating end perpendicular to the mating end. The mating end is configured to be mated with a mating connector. The terminating end is configured to be terminated to an end of a conductor of a cable. The plug connector includes a latch received in the latch chamber and coupled to the plug housing. The latch includes a main body and a latch member extending from the main body. The main body has an actuator configured to actuate the latch. The latch member includes a securing base coupled to the plug housing to secure the latch to the plug housing. The latch member includes a latching tab configured to be latchably coupled to the mating connector to secure the plug connector to the mating connector. The latch member includes a preload tab received in the window. The latch member is partially depressed when the preload tab is received in the window to create an internal preload force in the latch.

DETAILED DESCRIPTION OF THE INVENTION

Figure 1:
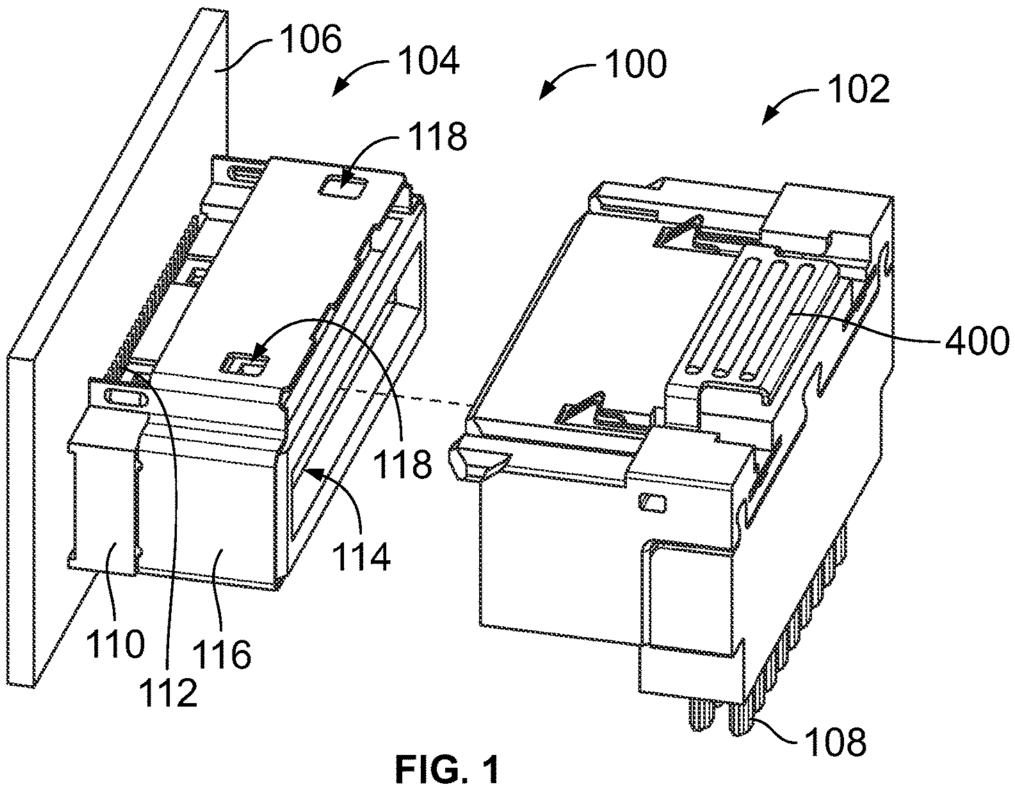
FIG. 1 illustrates an electrical connector system in accordance with an exemplary embodiment.

FIG. 1 illustrates an electrical connector system 100 in accordance with an exemplary embodiment. The electrical connector system 100 includes a plug connector 102 and a mating connector 104 that receives the plug connector 102. The mating connector 104 may be a receptacle connector and referred to hereinafter as a receptacle connector 104. In the illustrated embodiment, the receptacle connector 104 is mounted to a circuit board 106. However, in alternative embodiments, the receptacle connector 104 may be a cable connector. In an exemplary embodiment, the plug connector 102 is a cable connector having a plurality of cables 108 exiting the plug connector 102. In an exemplary embodiment, the plug connector 102 is a right angle connector having the cables 108 exiting the plug connector 102 in a direction perpendicular to the mating direction with the receptacle connector 104.

The plug connector 102 includes a latch 400 configured to latchably couple the plug connector 102 to the receptacle connector 104. The latch 400 is a deflectable latch movable between a latched position and an unlatched position. For example, the latch 400 may be depressed to unlatch the latch 400 from the receptacle connector 104. In an exemplary embodiment, plug connector 102 has a low profile or depth from the mating end. For example, both the cables 108 and the latch 400 do not extend beyond the rear of the plug housing of the plug connector 102. Both the cables 108 and the latch 400 are located forward of the rear of the plug housing of the plug connector 102 such that other components may be located rearward of the plug connector 102. The cables 108 and the latch 400 do not interfere with such other components rearward of the plug connector 102.

The receptacle connector 104 includes a receptacle connector housing 110 holding a plurality of receptacle connector contacts 112. In an exemplary embodiment, the receptacle connector housing 110 includes a slot 114 at a mating end of the receptacle connector housing 110 that receives the plug connector 102. The receptacle connector contacts 112 are arranged within the slot 114 for mating with the plug connector 102. The slot 114 may be a card slot. The slot 114 is elongated, such as being rectangular shaped. The receptacle connector contacts 112 are located along the top and the bottom of the slot 114 in an exemplary embodiment. In various embodiments, the receptacle connector contacts 112 are deflectable contacts having spring beams configured to be mated with the plug connector 102 when the plug connector 102 is plugged into the slot 114. Other types of contacts may be provided in alternative embodiments.

In an exemplary embodiment, the receptacle connector 104 includes a mating shroud 116 surrounding the receptacle connector housing 110. In the illustrated embodiment, the mating shroud 116 is a stamped and formed component separate and discrete from the receptacle connector housing 110. In alternative embodiments, the mating shroud 116 may be integral with the receptacle connector housing 110, such as being molded with the receptacle connector housing 110. The mating shroud 116 may be mated to the circuit board 106. The mating shroud 116 includes a receiving space configured to receive a portion of the plug connector 102. In the illustrated embodiment, the receiving space is located above a top of the receptacle connector housing 110. The mating shroud 116 includes latch openings 118 configured to receive latching elements of the latch 400 to secure the plug connector 102 to the receptacle connector 104.

Figure 2:
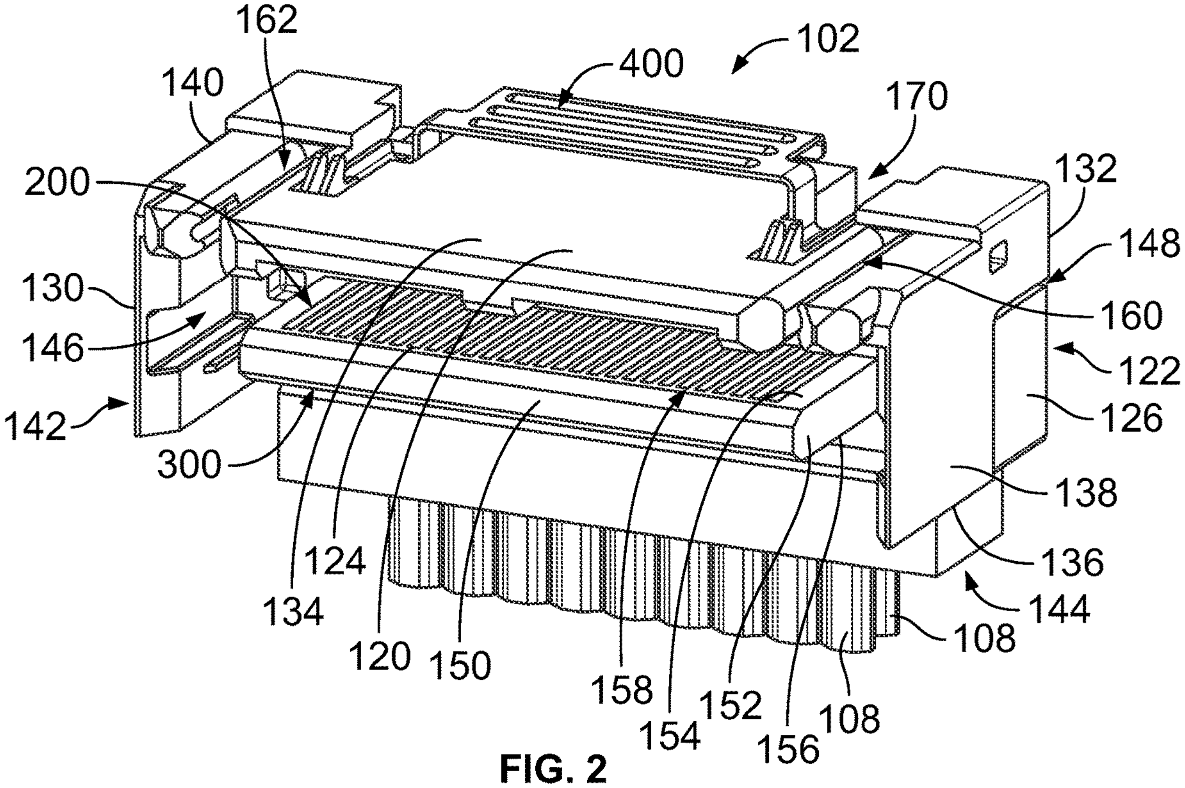
FIG. 2 is a front perspective view of the plug connector in accordance with an exemplary embodiment.

FIG. 2 is a front perspective view of the plug connector 102 in accordance with an exemplary embodiment. The plug connector 102 includes a plug housing 120 holding a contact assembly 122. The contact assembly 122 includes an array of contacts 124 configured to be electrically connected to the receptacle connector contacts 112 (shown in FIG. 1). The cables 108 are terminated to corresponding contacts 124. In an exemplary embodiment, the contact assembly 122 includes an upper module 200 and a lower module 300. The upper module 200 includes corresponding upper contacts and upper cables and the lower module 300 includes corresponding lower contacts and lower cables. The upper module 200 is positioned in an upper portion of the plug housing 120 and the lower module 300 is positioned in a lower portion of the plug housing 120. Utilizing the upper and lower modules 200, 300 increases contact density within the plug connector 102 compared to the plug connector 102 including a single set of contacts and cables.

In an exemplary embodiment, the contacts 124 are formed by one or more leadframes (for example, one leadframe for the upper module 200 and one leadframe for the lower module 300). In various embodiments, the contacts 124 are stamped and formed contacts (for example, all contacts within the leadframe stamped during a single stamping process and then formed to have a particular shape, such as including one or more bends). In an exemplary embodiment, the contacts 124 are right-angle contacts having right-angle bends. The right-angle contacts allow the cables 108 to extend from the plug housing 120 in a direction perpendicular to the mating direction with the receptacle connector 104 without the cables needing to be bent. The cables 108 extend straight from the right-angle contacts 124 to the exterior of the plug housing 120. The cables 108 are not bent 90° within the plug housing 120. As such, the plug housing 120 may be made relatively smaller, thus having a low-profile (narrow depth from front to rear), compared to plug connectors that accommodate 90° cable bends within the plug housing. In an exemplary embodiment, the contacts 124 may be arranged in multiple rows, such as an upper row and a lower row. In an exemplary embodiment, the cables 108 may be arranged in multiple rows, such as a front row and a rear row, corresponding to the multiple rows of contacts 124.

The plug housing 120 extends between a front 130 and a rear 132. The plug housing 120 has a top 134 and a bottom 136. The plug housing 120 has a first side 138 and a second side 140. In the illustrated embodiment, the front 130 defines a mating end 142 of the plug housing 120 and the bottom 136 defines a cable end 144 of the plug housing 120. The cable end 144 is generally perpendicular to the mating end 142. The cables 108 extend into the plug housing 120 at the cable end 144. The mating end 142 is configured to be mated with the receptacle connector 104. In an exemplary embodiment, the latch 400 is located at the top 134 of the plug housing 120, such as at the rear 132.

In an exemplary embodiment, the plug housing 120 includes a mating chamber 146 at the mating end 142. The contacts 124 of the contact assembly 122 extend into the mating chamber 146 for mating with the receptacle connector 104. The mating chamber 146 may be open at the front 130 for mating with the receptacle connector 104.

In an exemplary embodiment, the plug housing 120 includes a cable chamber 148 at the cable end 144. The cables 108 extend into the cable chamber 148. The contact assembly 122 is received in the cable chamber 148 for termination to the cables 108. The cable chamber 148 may be open at the bottom 136 to receive the cables 108. The cable chamber 148 may be open at the rear 132 to receive the contact assembly 122. For example, during assembly, the contact assembly 122 is loaded into the cable chamber 148 through the rear 132 and a portion of the contact assembly 122 and the cables 108 extend from the bottom 136. In an exemplary embodiment, the contact assembly 122 includes a contact assembly holder 126 holding the contacts 124 and/or the cables 108. The contact assembly holder 126 holds the contacts 124 and cables 108 of the upper module 200 and the contacts 124 and cables 108 of the lower module 300. The contact assembly holder 126 may be loaded into the plug housing 120, such as into the cable chamber 148. The contact assembly holder 126 holds relative positions of the contacts 124 and the cables 108 to allow loading of all of the contacts 124 and the cables 108 into the plug housing 120 as a single unit. However, the contacts 124 and/or the cables 108 may be loaded into the plug housing 120 individually rather than as a unit in alternative embodiments.

In an exemplary embodiment, the plug housing 120 includes a latch chamber 170 that receives the latch 400. In the illustrated embodiment, the latch chamber 170 is provided at the top 134 of the plug housing 120 to locate the latch 400. The latch chamber 170 may be open at the top 134 to provide access to the latch 400. The latch 400 may be actuated from above, such as by pressing downward on the latch to move the latch 400 from a latched position to an unlatched position. In an exemplary embodiment, the latch 400 is configured to be loaded into the latch chamber 170 through the rear 132.

In an exemplary embodiment, the plug housing 120 includes a plug nose 150 in the mating chamber 146. The plug nose 150 is configured to be plugged into the slot 114 of the receptacle connector 104 (shown in FIG. 1). In an exemplary embodiment, the plug nose 150 includes an elongated tray 152 used to support the contacts 124. The plug nose 150 includes an upper surface 154 and a lower surface 156. In an exemplary embodiment, the contacts 124 of the upper module 200 extend along the upper surface 154 and the contacts 124 of the lower module 300 extend along the lower surface 156 for mating with the receptacle connector contacts 112 (shown in FIG. 1). In an exemplary embodiment, the plug nose 150 includes pockets 158 along the upper surface 154 and the lower surface 156 that receive the contacts 124. As such, the contacts 124 may be generally flush with the upper surface 154 and the lower surface 156. In various embodiments, the plug nose 150 is integral with the plug housing 120. For example, the plug nose 150 is co-molded with the plug housing 120. In other various embodiments, the plug nose 150 may be formed separate and discrete from the plug housing 120 and coupled to the plug housing 120. For example, the plug nose 150 may be preassembled with the contact assembly 122 and loaded into the plug housing 120 with the contact assembly 122

The plug connector 102 includes one or more guide features 160 to guide mating with the receptacle connector 104. For example, the guide features 160 may include slots 162 that receive a portion of the receptacle connector 104 to position the plug connector 102 relative to the receptacle connector 104 during mating. Other types of guide features may be used in alternative embodiments, such as rails, tabs, pins, and the like. In an exemplary embodiment, the plug connector 102 may include a securing feature, such as a latch (not shown), for latchably securing the plug connector 102 to the receptacle connector 104

Figure 3:
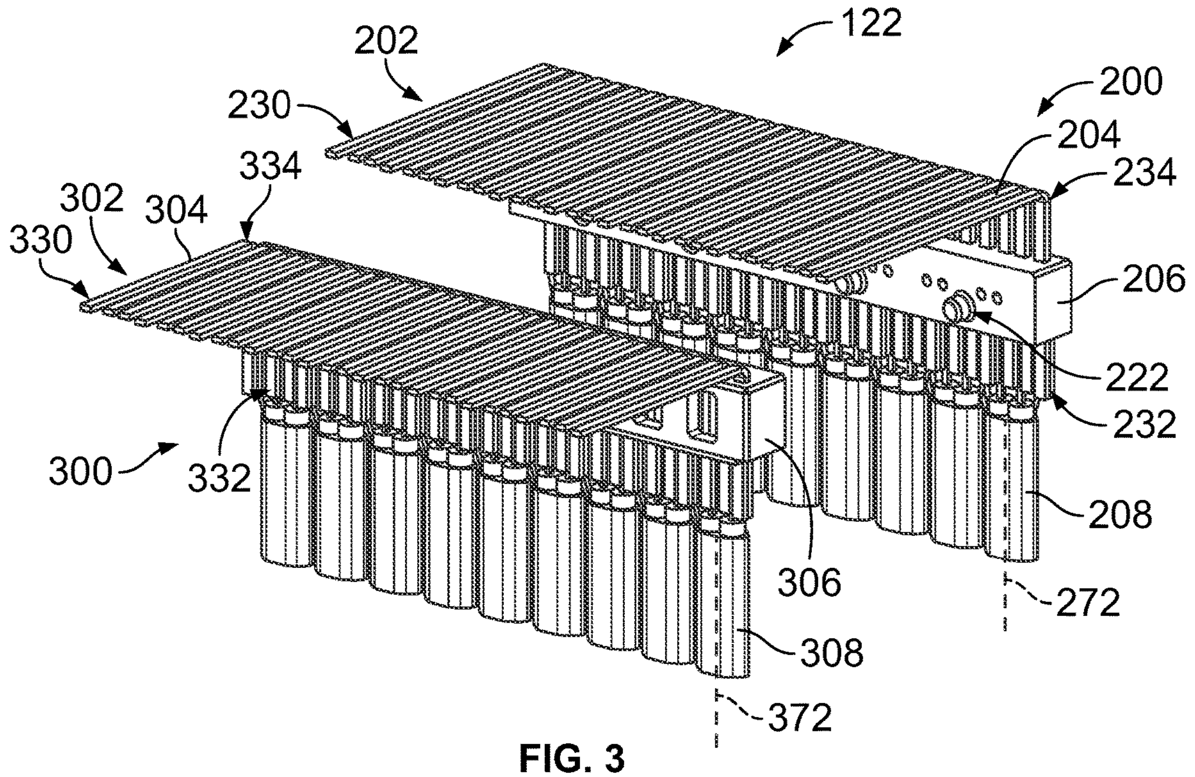
FIG. 3 is a front perspective view of a portion of the contact assembly showing the upper module and the lower module in accordance with an exemplary embodiment.

FIG. 3 is a front perspective view of a portion of the contact assembly 122 showing the upper module 200 and the lower module 300 in accordance with an exemplary embodiment. The upper module 200 is configured to be coupled to the lower module 300 to form the contact assembly 122. In an exemplary embodiment, the upper module 200 may be similar to the lower module 300; however, sizes and shapes of components of the upper module 200 may be different from the lower module 300.

The upper module 200 includes an upper contact array 202 of upper contacts 204. The upper module 200 includes an upper contact holder 206 holding the upper contacts 204. The upper module 200 includes upper cables 208 terminated to the upper contacts 204. In an exemplary embodiment, the upper contact array 202 is formed from a stamped lead frame. For example, all of the upper contacts 204 may be stamped from a common sheet of metal material.

The upper contact holder 206 is manufactured from a dielectric material. In an exemplary embodiment, the upper contact holder 206 is overmolded around the upper contacts 204 to hold relative positions of the upper contacts 204. In the illustrated embodiment, the upper contact holder 206 is generally box shaped; however, the upper contact holder 206 may have other shapes in alternative embodiments. In an exemplary embodiment, the upper contact holder 206 includes securing features 222 at the front 210 used to secure the upper contact holder 206 to the lower module 300. The securing features 222 may include posts and/or openings configured to be mated with corresponding securing features of the lower module 300.

In an exemplary embodiment, the upper contacts 204 are bent into a right-angle configuration during manufacture, such as after the upper contact holder 206 is coupled to the upper contacts 204. Each upper contact 204 includes a mating end 230 and a terminating end 232. A transition portion 234 is provided between the mating end 230 and the terminating end 232. The upper contact 204 is configured to be bent at the transition portion 234. The mating end 230 is configured to be mated with the receptacle connector contacts 112 (shown in FIG. 1). In various embodiments, the mating end 230 includes a mating pad defining a mating interface for the upper contact 204. The mating pad may be planar and flat for mating with the receptacle connector contact 112. The mating pad is configured to extend along the plug nose 150 (shown in FIG. 2) for connection to the receptacle connector contact 112. The upper cables 208 are configured to be terminated to the terminating ends 232. For example, the upper cables 208 may be soldered to the terminating ends 232. In various embodiments, the terminating end 232 includes a solder pad. The solder pad is generally planar and forms a surface to receive a portion of the upper cables 208 and soldered to create an electrical connection between the upper cable 208 and the upper contact 204.

In an exemplary embodiment, the upper contacts 204 include signal contacts and ground contacts. The ground contacts provide electrical shielding for the signal contacts. In an exemplary embodiment, the signal contacts may be arranged in pairs and the ground contacts may be arranged between the pairs of signal contacts. In various embodiments, a ground bus electrically connects the ground contacts to electrically common all of the ground contacts.

In an exemplary embodiment, each upper cable 208 is a twin-axial cable. The upper cable 208 includes a pair of conductors configured to be electrically connected to corresponding signal contacts. In an exemplary embodiment, the upper cable 208 includes a cable shield providing electrical shielding for the conductors.

The lower module 300 includes a lower contact array 302 of lower contacts 304. The lower module 300 includes a lower contact holder 306 holding the lower contacts 304. The lower module 300 includes lower cables 308 terminated to the lower contacts 304. In an exemplary embodiment, the lower contact array 302 is formed from a stamped leadframe, which may be different from the stamped leadframe of the upper module 200. For example, all of the lower contacts 304 may be stamped from a common sheet of metal material.

The lower contact holder 306 is manufactured from a dielectric material. In an exemplary embodiment, the lower contact holder 306 is overmolded around the lower contacts 304 to hold relative positions of the lower contacts 304. The lower contact holder 306 is configured to be coupled to the upper contact holder 206, such as using the securing features 222 and complimentary securing features on the lower contact holder 306. The securing features may be connected by an interference fit.

In an exemplary embodiment, the lower contacts 304 include signal contacts and ground contacts. Each lower contact 304 includes a mating end 330 and a terminating end 332. A transition portion 334 is provided between the mating end 330 and the terminating end 332. The lower contacts 304 are bent into a right-angle configuration at the transition portion 334 such that the lower mating end 330 is perpendicular to the lower terminating end 332. The lower cables 308 are terminated to the terminating ends 332. Lengths of the mating ends 330 and/or the terminating ends 332 may be shorter than the mating ends 230 and/or the terminating ends 232.

In an exemplary embodiment, each lower cable 308 is a twin-axial cable. The lower cable 308 includes a pair of conductors configured to be electrically connected to corresponding signal contacts. In an exemplary embodiment, the lower cable 308 includes a cable shield providing electrical shielding for the conductors.

When assembled, the upper module 200 is coupled to the lower module 300. The contact holders 206, 306 hold the relative positions of the contacts 204, 304. The upper contacts 204 are located in an upper row and the lower contacts 304 are located in a lower row. The upper mating ends 230 of the upper contacts 204 are located above the lower mating ends 330 of the lower contacts 304. The upper terminating ends 232 of the upper contacts 204 are located rearward of the lower terminating ends 332 of the lower contacts 304. The upper cables 208 are located rearward of the lower cables 308. The upper cables 208 extend along linear cable axes 272. The lower cables 308 extend along linear cable axes 372, which are parallel to the cable axes 272. The upper cables 208 are arranged in a row with the linear cable axes 272 parallel to each other. The lower cables 208 are arranged in a row with the linear cable axes 372 parallel to each other and parallel to the upper cables 208. The upper and lower cables 208, 308 extend straight downward from the terminating ends 232, 332. The upper and lower cables 208, 308 do not have bends. Rather, the upper and lower contacts 204, 304 have 90° bends to transition between the mating end and the cable end of the contact assembly 122. As such, the front-to-rear dimension may be relatively short compared to contact assemblies having planar contacts with cables bent 90° to form the right angle transition. In various embodiments, use of the right-angle contacts to form the right angle transition (compared to use of the cables to form the right angle transition) may reduce the front-to-rear dimension by approximately half.

Figure 4:
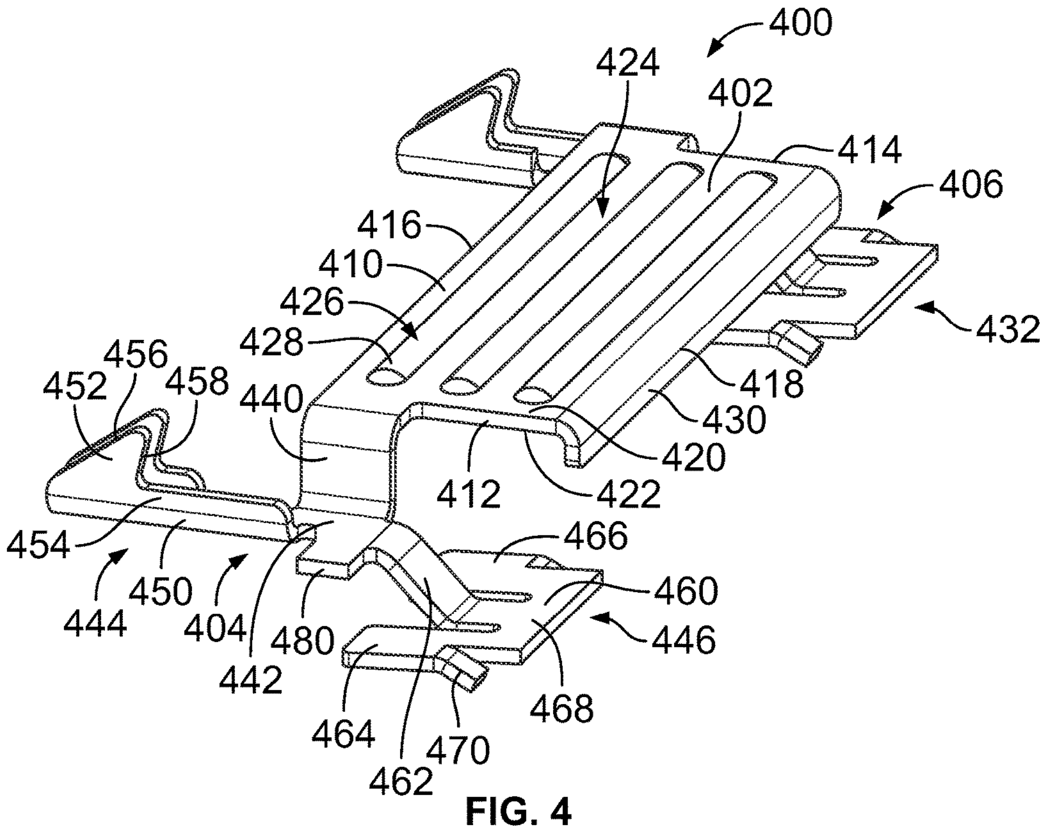
FIG. 4 is a perspective view of the latch in accordance with an exemplary embodiment.

FIG. 4 is a perspective view of the latch 400 in accordance with an exemplary embodiment. In an exemplary embodiment, the latch 400 is stamped and formed from a piece of sheet metal. The latch 400 is a single, unitary, monolithic structure configured to be latchably coupled to the receptacle connector 104 (shown in FIG. 1).

The latch 400 includes a main body 402, a first latch member 404 extending from the main body 402 at a first side of the latch 400, and a second latch member 406 extending from the main body 402 at a second side of the latch 400. While the latch 400 is illustrated including a pair of the latch members 404, 406, the latch 400 may include greater or fewer latch members in alternative embodiments. The latch members 404, 406 may be similar to each other and include similar components. The first latch member 404 is described in detail below and it is recognized that the second latch member 406 may include like components identified with like reference numerals.

The main body 402 includes a plate 410 extending between a first side 412 and a second side 414. The plate 410 extends between a front 416 and a rear 418. The plate 410 has a top 420 and a bottom 422. In the illustrated embodiment, the main body 402 is generally rectangular; however, the main body 402 may have other shapes in alternative embodiments. In an exemplary embodiment, the main body 402 defines an actuator 424 of the latch 400. For example, the plate 410 includes a press button 426 defining the actuator 424 that is configured to be depressed downward to actuate the latch 400 and move the latch members 404, 406 to an unlatched position. The plate 410 includes bumps or ribs 428 along the top 420 forming part of the press button 426. The ribs 428 define a finger grip engaged by the operator finger to actuate the latch 400. In various embodiments, the actuator 424 may additionally or alternatively include a pull tab configured to be pulled to actuate the latch 400. For example, the pull tab may be coupled to the rear 418 and is configured to be pulled upward to rotate the front of the latch downward and thus move the latch members 404, 406 to the unlatched position. The pull tab may be connected directly to the plate 410.

In an exemplary embodiment, the main body 402 includes a lip 430 along the rear 418 of the plate 410. The main body 402 may additionally or alternatively include the lip 430 at the front 416 of the plate 410. The lip 430 is bent perpendicular to the plate 410. For example, the lip 430 may be folded downward (or upward) relative to the plate 410. The lip 430 provide structural rigidity for the main body 402. In an exemplary embodiment, the lip 430 defines a rear 432 of the latch 400. The lip 430 is the rearward most structure of the latch 400.

The latch member 404 extends from the main body 402. In an exemplary embodiment, the latch member 404 extends from the first side 412 of the plate 410. The latch member 404 includes a connecting beam 440 extending between the main body 402 and an elongated member 442 of the latch member 404. The latch member 404 includes a latching portion 444 forward of the connecting beam 440 and a supporting portion 446 rearward of the connecting beam 440.

The latching portion 444 includes a latch arm 450 and one or more latching tabs 452 extending from the latch arm 450. The latching tabs 452 are configured be received in the latch openings 118 (shown in FIG. 1) of the mating shroud 116 (shown in FIG. 1) to latchably secure the plug connector 102 to the receptacle connector 104. In an exemplary embodiment, the latch arm 450 includes a pair of side walls 454 folded upward from the elongated member 442. The side walls 454 and structural rigidity to the latch arms 450. The latching tabs 452 extend from the upper surfaces of the sidewalls 454. In an exemplary embodiment, the latching portion 444 includes a pair of the latching tabs 452 to increase the latching strength of the latching portion 444. For example, both latching tabs 452 are configured be received in the same latch opening 118. Each latching tab 452 includes a ramp 456 at the front of the latching tab 452 and a catch surface 458 and a rear of the latching tab 452. The ramp 456 is angled to form a wedge shaped latching tab 452. In an exemplary embodiment, the catch surface 458 is undercut to form a pocket that receives the mating shroud 116 of the receptacle connector 104. The catch surface 458 is configured to engage the mating shroud 116 of the receptacle connector 104 in the latch opening 118 to retain the plug connector 102 in the receptacle connector 104.

The supporting portion 446 includes a securing base 460 and a support beam 462. The support beam 462 is the rearward portion of the elongated member 442. In an exemplary embodiment, the support beam 462 includes one or more bends such that the support beam 462 is angled and non-coplanar with the latch arm 450. For example, the support beam 462 may be bent downward, such as at a 45° angle, relative to the latch arm 450. The support beam 462 extends between the connecting beam 440 and the securing base 460. In an exemplary embodiment, the latch member 404 is deflectable at the support beam 462. For example, the support beam 462 may be deflected relative to the securing base 460 at the latch 400 moves between the latched position and the unlatched position. In various embodiments, the latch beam 462 may be rotated or pivoted, when deflected, at the intersection between the support beam 462 at the securing base 460. The latch arm 450 is movable relative to the securing base 460 with the support beam 462. For example, when the actuator 424 is actuated (for example, pressed downward) the movement is transitioned from the main body 402 to the latch member 404 through the connecting beam 440 and the support beam 462.

In an exemplary embodiment, the securing base 460 is generally planar and oriented generally parallel to the plate 410 of the main body 402. For example, the securing base 460 may be oriented generally horizontally. In an exemplary embodiment, the support beam 462 extends from a center of the securing base 460. The securing base 460 includes a first support tab 464 along a first side of the support beam 462 and a second support tab 466 along a second side of the support beam 462. The securing base 460 includes a rear connecting beam 468 between the first and second support tabs 464, 466. The support beam 462 extends forward from the rear connecting beam 468 and eventually transitions out of plane relative to the securing base 460. In an exemplary embodiment, the securing base 460 includes one or more lances 470 extending from the securing base 460. The lances 470 may extend from the first and second support tabs 464, 466. The lances 470 are bent out of plane relative to the securing base 460. For example, the lances 470 may be bent downward. The lances 470 are used to secure the securing base 460 in the plug housing 120 (shown in FIG. 2).

In an exemplary embodiment, the latch member 404 includes a preload tab 480 configured to position the latch 400 relative to the plug housing 120. In the illustrated embodiment, the preload tab 480 extends outward from the elongated member 442; however, the preload tab 480 may be at other locations in alternative embodiments. The preload tab 480 is used to partially deflect the latch 400 within the plug housing 120 and create an internal preload biasing force within the structure of the latch 400. For example, when the support beam 462 is deflected, the support beam 462 is elastically deformed creating an internal biasing force tending to return the board beam 462 to the undeflected position. In the illustrated embodiment, the support beam 462 is forced downward when actuated to the unlatched position creating an internal biasing force in an upward direction tending to return the latch member 404 to the latched position. Even when partially deflected, the internal biasing force tends to return the latch member 404 upward. Such preloading of the latch member 404 is used to normally position the latch member 404 in the latched position.

Figure 5:
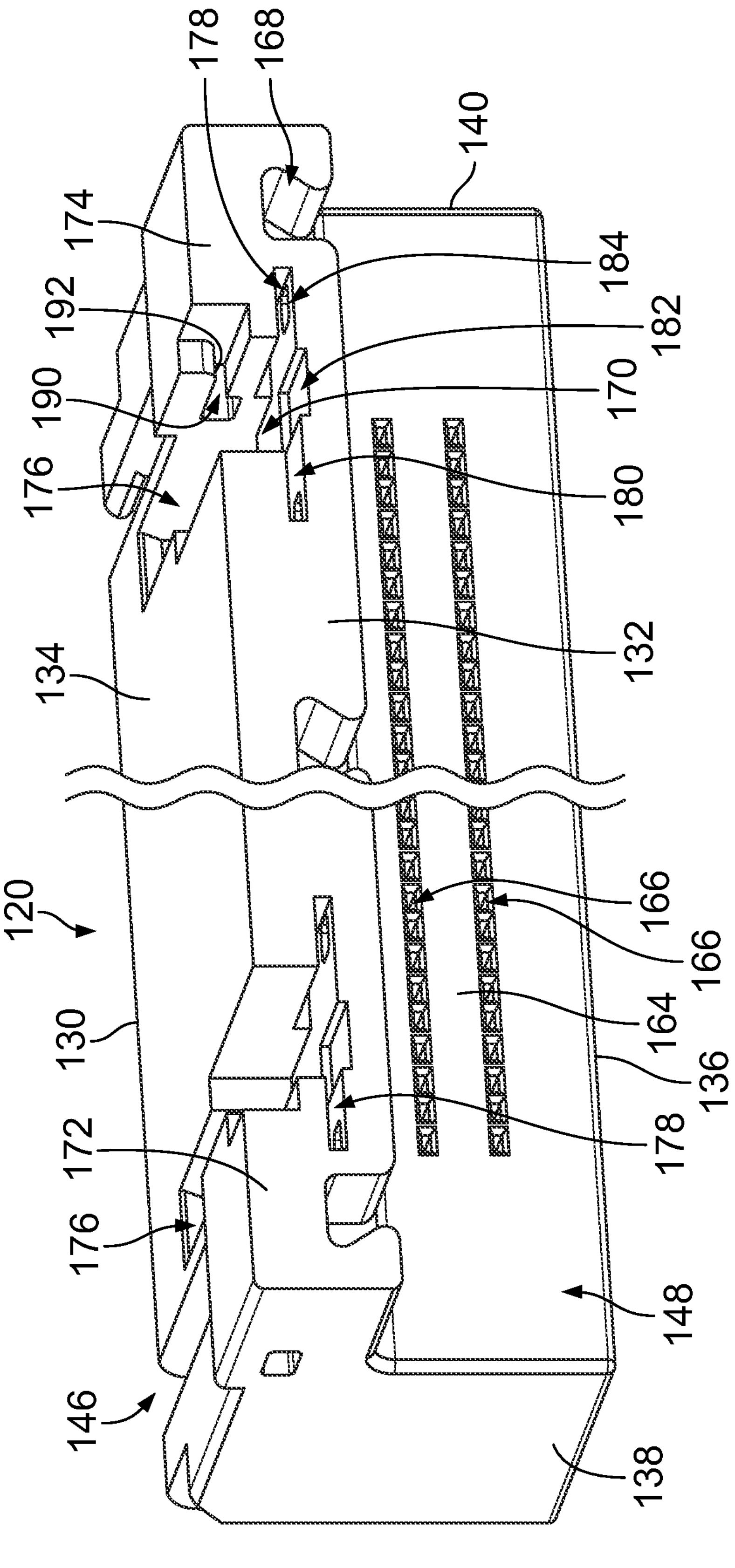
FIG. 5 is a rear perspective view of the plug housing in accordance with an exemplary embodiment.

FIG. 5 is a rear perspective view of the plug housing 120 in accordance with an exemplary embodiment. The top 134 of the plug housing 120 extends between the front 130 and the rear 132. The latch chamber 170 is located at the top 134 to receive the latch 400 (shown in FIG. 4). The latch chamber 170 is open at the top 134 between a first latch mounting block 172 at the first side 138 and a second latch mounting block 174 at the second side 140. In an exemplary embodiment, the latch chamber 170 is open at the rear 132 such that the latch 400 is configured to be loaded into the latch chamber 170 through the rear 132.

The latch chamber 170 includes latching portion channels 176 configured to receive the latching portions 444 of the latch members 404, 406 and supporting portion channels 178 configured to receive the supporting portions 446 of the latch members 404, 406. In the illustrated embodiment, the supporting portion channels 178 are provided at the rear 132 and the latching portion channels 176 are located forward of the supporting portion channels 178.

The latching portion channels 176 provide a clearance space for the latch arms 450 and the latching tabs 452 as the latch members 404, 406 move between the latched position and the unlatched position. For example, the latch arms 450 and the latching tabs 452 may be moved into the latching portion channels 176 when the latch members 404, 406 are moved to the unlatched position.

The supporting portion channels 178 are configured to receive the securing base 460 and the support beams 462. In an exemplary embodiment, each of the supporting portion channels 178 includes a base pocket 180 configured to receive the securing base 460, a beam pocket 182 configured to receive the support beam 462, and one or more lance pockets 184 configured to receive the lances 470. The supporting portion channels 178 may include additional pockets or features in alternative embodiments.

In an exemplary embodiment, the latch chamber 170 includes preload windows 190, such as in the first and second latch mounting blocks 172, 174. The preload windows 190 are configured to receive corresponding preload tabs 480. In an exemplary embodiment, the latch chamber 170 includes guide rails 192 configured to guide the preload tabs 480 into the preload windows 190. The preload windows 190 in the guide rails 192 may be accessible from the rear 132 of the plug housing 120.

In an exemplary embodiment, the plug housing 120 includes a wall 164 between the mating chamber 146 and the cable chamber 148. In the illustrated embodiment, the wall 164 as a vertical orientation. The plug nose 150 (shown in FIG. 2) extends forward of the wall 164 into the mating chamber 146. The wall 164 includes a plurality of contact channels 166 extending therethrough. The contact channels 166 are configured to receive the mating ends of the contacts 124 (shown in FIG. 2). The contacts 124 may be loaded into the contact channels 166 from behind the wall 164, such as from the cable chamber 148. In the illustrated embodiment, the contact channels 166 are arranged in an upper row and a lower row.

In an exemplary embodiment, the cable chamber 148 is open at the rear 132 to receive the contact assembly 122 (shown in FIG. 3). In an exemplary embodiment, the cable chamber 148 is open at the bottom 136 to allow the contact assembly 122 and/or the cables 108 to extend from the bottom 136 of the plug housing 120. Optionally, the cable chamber 148 may be open at the sides 138, 140. The plug housing 120 includes securing features 168 for securing the contact assembly 122 in the cable chamber 148. In the illustrated embodiment, the securing features 168 are pockets formed in the upper wall of the plug housing 120. The pockets may be dovetailed pockets in various embodiments. Other types of securing features may be used in alternative embodiments.

Figure 6:
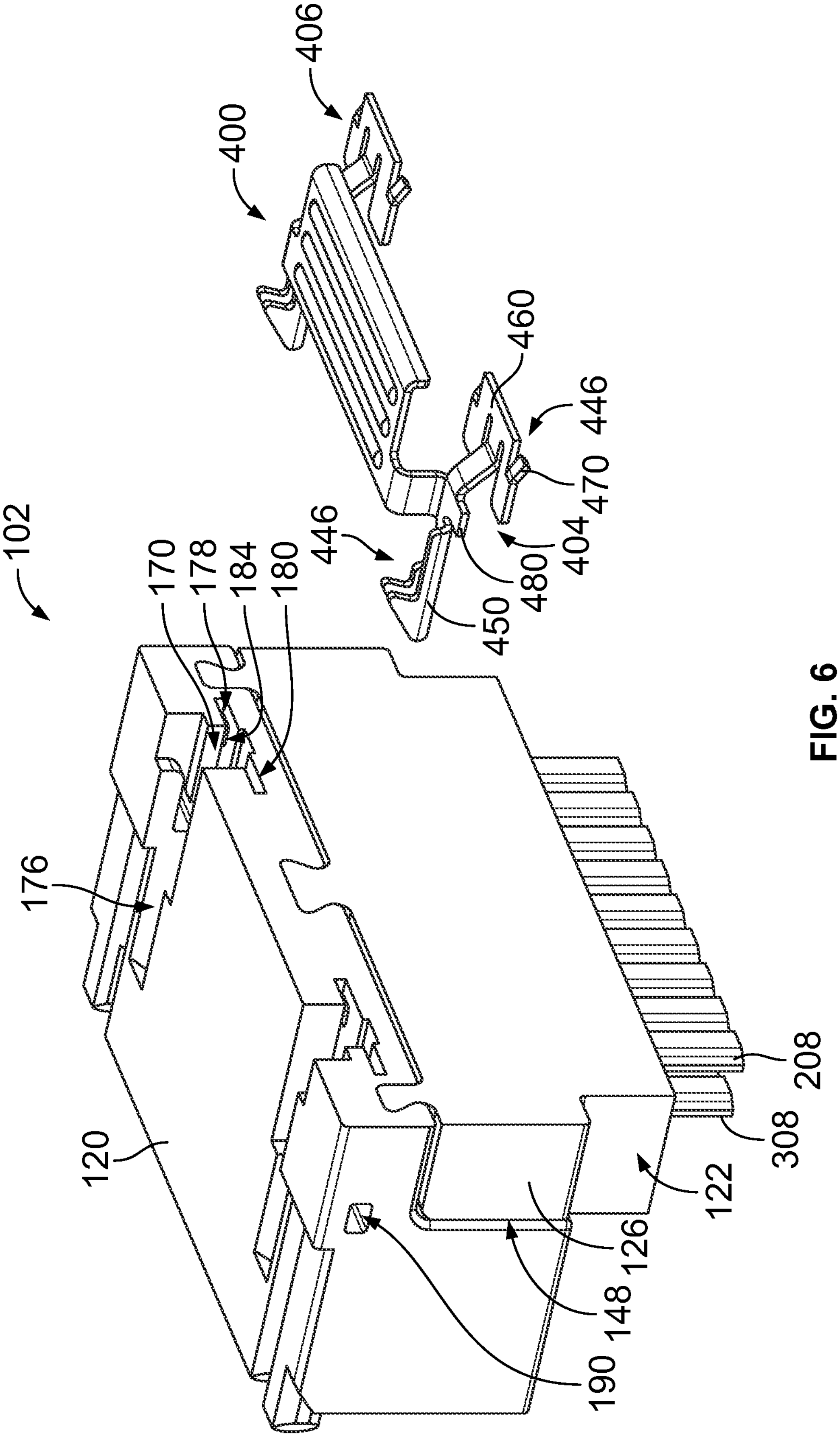
FIG. 6 is a rear perspective view of the plug connector in accordance with an exemplary embodiment showing the latch poised for mating with the plug housing.

FIG. 6 is a rear perspective view of the plug connector 102 in accordance with an exemplary embodiment showing the latch 400 poised for mating with the plug housing 120. FIG. 6 illustrates the contact assembly 122 coupled to the plug housing 120. For example, the contact assembly holder 126 is received in the cable chamber 148 and coupled to the plug housing 120. In an exemplary embodiment, the contact assembly holder 126 includes an overmold body formed in place around the contacts 204, 304 (shown in FIG. 3) and the cables 208, 308. For example, the overmold body may be overmolded over the contacts 204, 304, the contact holders 206, 306 (shown in FIG. 3), and the cables 208, 308. The overmold body provides strain relief for the cables 208, 308. The cables 208, 308 extend vertically downward from the bottom of the plug connector 102.

During assembly, the latch 400 is aligned with the latch chamber 170, such as rearward of the plug housing 120. The latching portions 444 of the latch members 404, 406 are aligned with the latching portion channels 176. The supporting portions 446 of the latch members 404, 406 are aligned with the supporting portion channels 178. During assembly, the latch arms 450 are received in the latching portion channels 176. The securing bases 460 are received in the corresponding base pockets 180. The lances 470 are received in the corresponding lance pockets 184. The preload tabs 480 are received in the corresponding preload windows 190.

Figure 7:
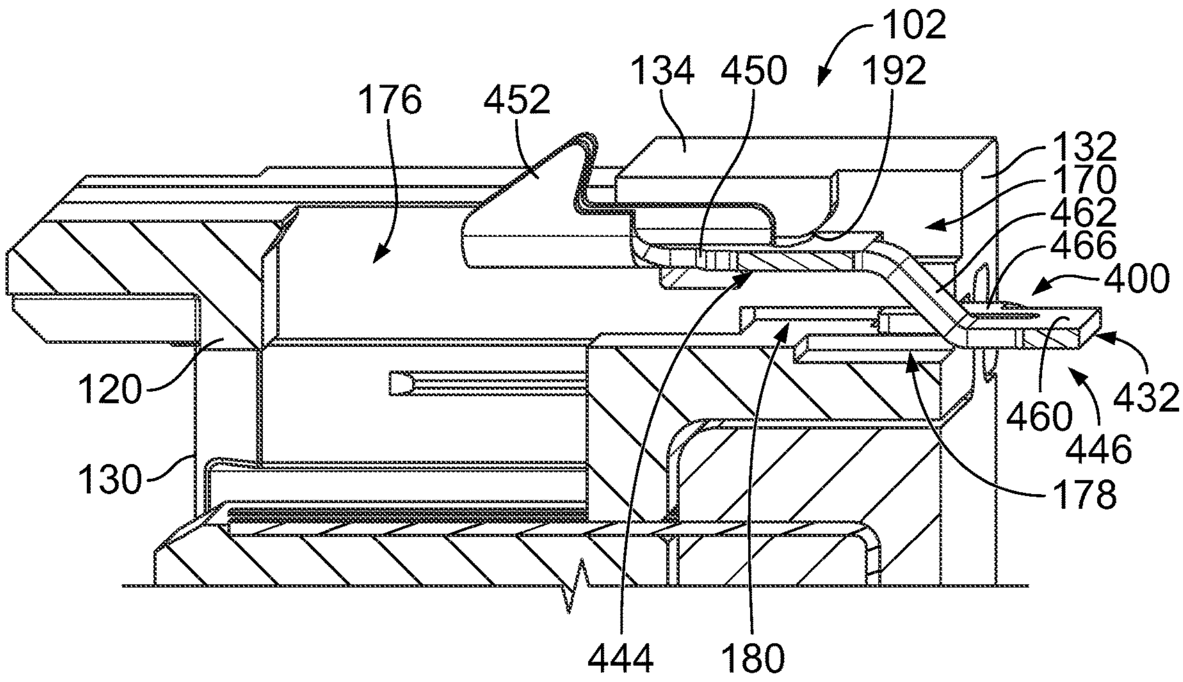
FIG. 7 is a cross-sectional view of a portion of the plug connector in accordance with an exemplary embodiment showing the latch partially mated with the plug housing.
Figure 8:
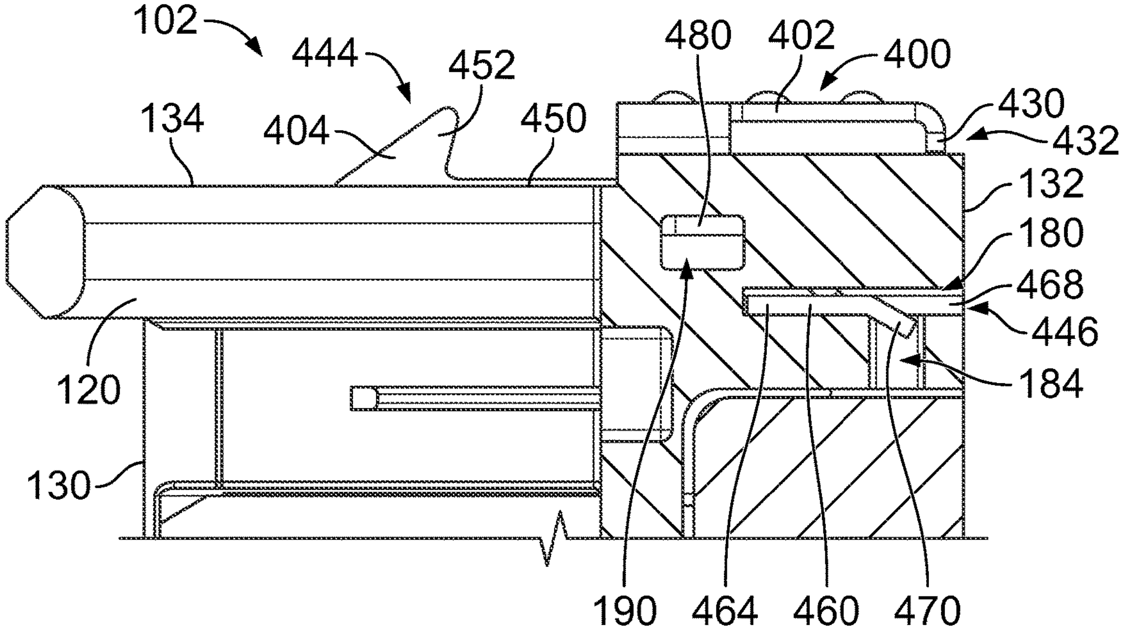
FIG. 8 is a cross-sectional view of a portion of the plug connector in accordance with an exemplary embodiment showing the latch mated with the plug housing and showing the latch in a latched position.
Figure 9:
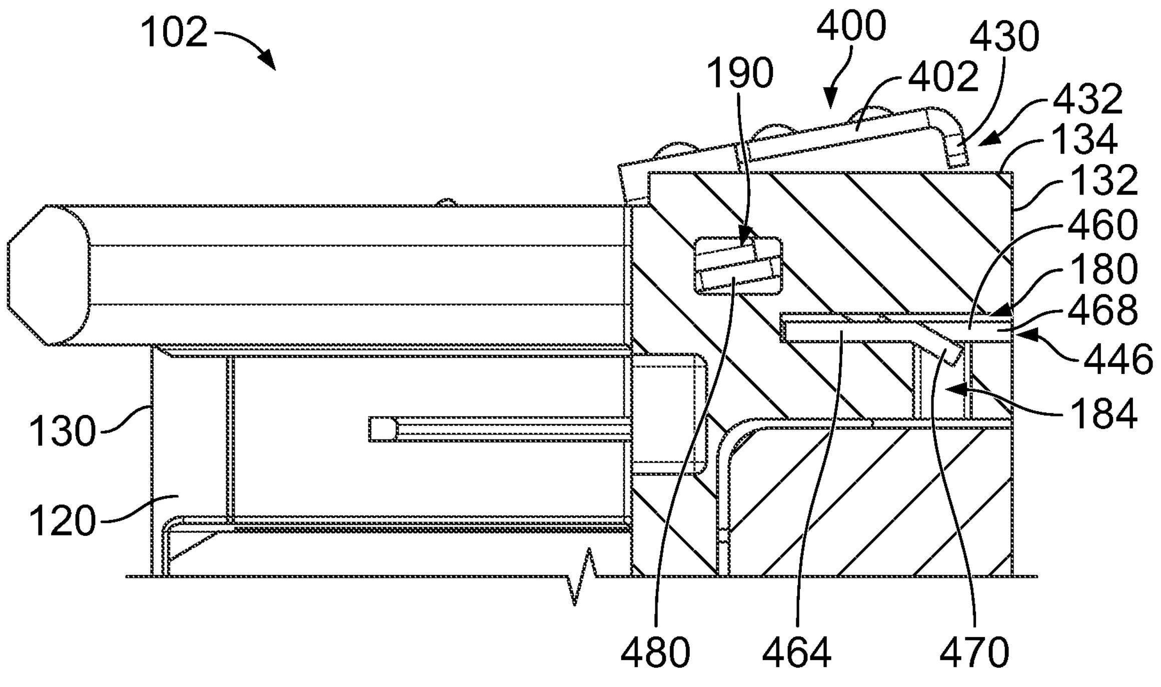
FIG. 9 is a cross-sectional view of a portion of the plug connector in accordance with an exemplary embodiment showing the latch in an unlatched position.

FIG. 7 is a cross-sectional view of a portion of the plug connector 102 in accordance with an exemplary embodiment showing the latch 400 partially mated with the plug housing 120. FIG. 8 is a cross-sectional view of a portion of the plug connector 102 in accordance with an exemplary embodiment showing the latch 400 mated with the plug housing 120 and showing the latch 400 in a latched position. FIG. 9 is a cross-sectional view of a portion of the plug connector 102 in accordance with an exemplary embodiment showing the latch 400 in an unlatched position. During assembly, the latch 400 is loaded into the latch chamber 170 in a forward loading direction from behind (rearward of) the plug housing 120.

During assembly, the latching portion 444 of the latch member 404 is aligned with the latching portion channel 176. The latch arm 450 and the latching tab 452 are received in the latching portion channel 176 as the latch 400 is advanced forward in the loading direction. The latching portion channel 176 is oversized relative to the latch arm 450 and the latching tab 452 to accommodate movement of the latch arm 450 and the latching tab 452 within the latching portion channel 176. For example, the latch arm 450 and the latching tab 452 may be pressed downward into the latching portion channel 176 as the latch 400 is moved to the unlatched position. Clearance space is provided below the latch arm 450 to accommodate such movement.

During assembly, the supporting portion 446 of the latch member 404 is aligned with the supporting portion channel 178. The securing base 460 is received in the base pocket 180. For example, the support tabs 464, 466 along the sides of the support beam 462 are received in the base pocket 180 and captured from above and below by the plug housing 120. As such, the securing base 460 is unable to move up or down within the base pocket 180. The lances 470 are received in the lance pockets 184. For example, when the latch 400 is fully loaded into the plug housing 120, the lances 470 are aligned with the lance pockets 184 (shown in FIG. 8) and the lances 470 snap into the lance pockets 184 to retain the securing base 460 in the base pocket 180. The lances 470 prevent pullout of the securing base 460 from the base pocket 180. For example, the plug housing 120 forms a stop surface at the rear of the lance pocket 184 to prevent rearward pullout of the securing base 460 from the base pocket 180. The latching portion 444 is positioned in the plug housing 120 by the securing base 460. For example, the support beam 462 extends from the securing base 460 and supports the latching portion 444. The support beam 462 and the latching portion 444 are cantilevered from the securing base 460 and are configured to be deflected when the latch 400 is actuated to the unlatched position.

During assembly, the preload tabs 480 are received in the corresponding preload windows 190 (FIGS. 8 and 9). The guide rails 192 (FIG. 7) guide the preload tabs 480 into the preload windows 190 as the latch 400 is loaded in the forward loading direction. The guide rails 192 partially compress the latch 400 to a preloaded position. When the preload tabs 480 are received in the preload windows 190, the latch 400 is held in the partially compressed, preloaded position (FIG. 8). The plug housing 120 prevents the latch 400 from returning to a fully unloaded position, rather retaining the latch 400 and the preloaded position. The latch 400 is configured to be deflected from the preloaded position to the unlatched position (FIG. 9). The preload windows 190 are oversized to allow the preload tabs 480 to move within the preload windows 190 from the latched position to the unlatched position. In the latched position, the latching tabs 452 extend above the top 134 of the plug housing 120 and are configured to be received in the latch openings 118 of the receptacle connector 104 (both shown in FIG. 1). In the unlatched position, the latch 400 is deflected downward such that the latching tabs 452 are moved into the latching portion channel 176, such as below the top 134 of the plug housing 120 to allow unmating of the plug connector 102 from the receptacle connector 104.

When the latch 400 is fully loaded in the plug housing 120, the latch 400 is contained within the depth envelope of the plug housing 120. For example, the front of the latch 400 is located at or rearward of the front 130 of the plug housing 120 and the rear 432 of the latch 400 is located at or forward of the rear 132 of the plug housing 120. In the illustrated embodiment, the rear 432 of the latch 400 is defined by the rear connecting beam 468 of the securing base 460. The rear 432 may additionally or alternatively be defined by the lip 430 of the main body 402. By providing the latch 400 forward of the rear 132 of the plug housing 120, the latch does not add to the overall depth (for example, front-to-rear dimension) of the plug connector 102. Other components may be located immediately rearward of the plug connector 102 without interference from the latch 400 or the cables 108 (shown in FIG. 1).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A plug connector comprising:

a plug housing including a mating end and a cable end, the mating end at a front of the plug housing, the cable end oriented perpendicular to the mating end, the plug housing including a mating chamber at the mating end and a cable chamber at the cable end, the plug housing including a cable exit at the cable end;

a contact assembly coupled to the plug housing, the contact assembly including an array of contacts, each contact including a mating end and a terminating end, each contact being a right angle contact having the terminating end being perpendicular to the mating end, the mating end configured to be mated with a mating connector, the terminating end configured to be terminated to an end of a conductor of a cable; and a latch coupled to the plug housing, the latch including a main body and a latch member extending from the main body, the main body having an actuator configured to actuate the latch, the latch member including a securing base coupled to the plug housing to secure the latch to the plug housing, the securing base extending rearward of the cable exit, the latch member including a latching tab configured to be latchably coupled to the mating connector to secure the plug connector to the mating connector.

2. The plug connector of claim 1, wherein the main body includes a plate extending between a front and a rear and extending between a first side and a second side, the latch member provided at the first side, the rear of the plate located at or forward of a rear of the plug housing.

3. The plug connector of claim 2, wherein the latch further comprises a second latch member extending from the second side of the plate, the second latch member including a second securing base coupled to the plug housing, the second latch member including a second latching tab configured to be latchably coupled to the mating connector.

4. The plug connector of claim 2, wherein the main body includes a lip bent perpendicular relative to the plate and located along the rear of the plate, the lip defining a rear of the latch, the lip located at or forward of the rear of the plug housing.

5. The plug connector of claim 1, wherein the latch member is coupled to the main body by a connecting beam, the connecting beam moving the latching tab relative to the securing base when the actuator is actuated.

6. The plug connector of claim 1, wherein the latch member includes a support beam between the latching tab and the securing base, the support beam being deflectable relative to the securing base with the actuator is actuated.

7. The plug connector of claim 1, wherein the latching tab is movable relative to the securing base between a latched position and an unlatched position.

8. The plug connector of claim 1, wherein the plug housing includes a lance pocket, the securing base including a lance extending therefrom, the lance being received in the lance pocket to retain the securing base in the plug housing.

9. The plug connector of claim 1, wherein the plug housing includes a latch chamber and a window open to the latch chamber, the latch being received in the latch chamber, the latch member including a preload tab received in the window, the latch member being partially depressed when the preload tab is received in the window to create an internal preload force in the latch.

10. The plug connector of claim 1, wherein the actuator includes a push button configured to be pressed toward the plug housing to actuate the latch.

11. The plug connector of claim 10, wherein the actuator includes a pull tab coupled to the main body, the pull tab configured to be pulled away from the plug housing to actuate the latch.

12. The plug connector of claim 1, wherein the contacts are bent 90° in the cable chamber, the cables extending from the terminating ends of the contacts along linear cable axes oriented perpendicular to the mating ends of the contacts.

13. The plug connector of claim 1, wherein the plug housing includes a plug nose in the mating chamber configured to be plugged into a mating slot of the mating connector, the plug nose including an upper surface and a lower surface, the contacts including upper contacts and lower contacts, the mating ends of the upper contacts extending along the upper surface, the mating ends of the lower contacts extending along the lower surface.

14. The plug connector of claim 1, wherein the plug housing includes a latch chamber and a window open to the latch chamber, the latch being received in the latch chamber, the latch member including a preload tab received in the window, the latch member being partially depressed when the preload tab is received in the window to create an internal preload force in the latch.

15. A plug connector comprising:

a plug housing having a front and a rear, the plug housing having a top and a bottom, the plug housing having a first side and a second side, the plug housing including a mating end at the front of the plug housing and a cable end at the bottom of the plug housing, the plug housing including a mating chamber at the mating end and a cable chamber at the cable end;

a contact assembly coupled to the plug housing, the contact assembly including an array of contacts, each contact including a mating end and a terminating end, each contact being a right angle contact having the terminating end being perpendicular to the mating end, the mating end configured to be mated with a mating connector, the terminating end configured to be terminated to an end of a conductor of a cable, wherein the terminating end extends parallel to the rear of the plug housing; and a latch coupled to the plug housing, the latch having a rear located at or forward of the rear of the plug housing, the latch including a main body and a latch member extending from the main body, the main body having an actuator configured to actuate the latch, the actuator provided at the rear, the latch member including a securing base coupled to the plug housing to secure the latch to the plug housing, the securing base extending rearward of the cable end, the latch member including a latching tab configured to be latchably coupled to the mating connector to secure the plug connector to the mating connector.

16. The plug connector of claim 15, wherein the main body includes a plate extending between a front and a rear and extending between a first side and a second side, the latch member provided at the first side, the rear of the plate located at or forward of the rear of the plug housing, the latch further comprising a second latch member extending from the second side of the plate, the second latch member including a second securing base coupled to the plug housing, the second latch member including a second latching tab configured to be latchably coupled to the mating connector.

17. The plug connector of claim 15, wherein the latch member includes a support beam between the latching tab and the securing base, the support beam being deflectable relative to the securing base when the actuator is actuated, the latching tab being movable relative to the securing base between a latched position and an unlatched position when the support beam is deflected.

18. A plug connector comprising:

a plug housing including a mating end and a cable end, the cable end oriented perpendicular to the mating end, the plug housing including a mating chamber at the mating end and a cable chamber at the cable end, the plug housing including a latch chamber and a window open to the latch chamber;

a contact assembly coupled to the plug housing, the contact assembly including an array of contacts, each contact including a mating end and a terminating end, each contact being a right angle contact having the terminating end being perpendicular to the mating end, the mating end configured to be mated with a mating connector, the terminating end configured to be terminated to an end of a conductor of a cable; and a latch received in the latch chamber and coupled to the plug housing, the latch including a main body and a latch member extending from the main body, the main body having an actuator configured to actuate the latch, the latch member including a securing base coupled to the plug housing to secure the latch to the plug housing, the latch member including a latching tab configured to be latchably coupled to the mating connector to secure the plug connector to the mating connector, the latch member including a preload tab received in the window, the latch member being partially depressed when the preload tab is received in the window to create an internal preload force in the latch.

19. The plug connector of claim 18, wherein the main body includes a plate extending between a front and a rear and extending between a first side and a second side, the latch member provided at the first side, the rear of the plate located at or forward of a rear of the plug housing, the latch further comprising a second latch member extending from the second side of the plate, the second latch member including a second securing base coupled to the plug housing, the second latch member including a second latching tab configured to be latchably coupled to the mating connector.

20. The plug connector of claim 18, wherein the latch member includes a support beam between the latching tab and the securing base, the support beam being deflectable relative to the securing base when the actuator is actuated, the latching tab being movable relative to the securing base between a latched position and an unlatched position when the support beam is deflected.

* * * * *